(12) United States Patent
Yoon et al.

(10) Patent No.: US 12,530,781 B2
(45) Date of Patent: Jan. 20, 2026

(54) APPARATUS AND METHOD FOR COMPRESSING IMAGE FOR MACHINE VISION

(71) Applicants: ELECTRONICS AND TELECOMMUNICATIONS RESEARCH INSTITUTE, Daejeon (KR); KONKUK UNIVERSITY INDUSTRIAL COOPERATION CORP, Seoul (KR)

(72) Inventors: Kyoung-Ro Yoon, Seoul (KR); Han-Shin Lim, Daejeon (KR); Hyon-Gon Choo, Daejeon (KR); Shin Kim, Seoul (KR); Ye-Gi Lee, Hanam-si (KR)

(73) Assignees: ELECTRONICS AND TELECOMMUNICATIONS RESEARCH INSTITUTE, Daejeon (KR); KONKUK UNIVERSITY INDUSTRIAL COOPERATION CORP, Seoul (KR)

(*) Notice: Subject to any disclaimer, the term of this patent is extended or adjusted under 35 U.S.C. 154(b) by 330 days.

(21) Appl. No.: 17/697,463

(22) Filed: Mar. 17, 2022

(65) Prior Publication Data

US 2022/0301181 A1  Sep. 22, 2022

(30) Foreign Application Priority Data

Mar. 18, 2021 (KR) .................. 10-2021-0035397
Nov. 10, 2021 (KR) .................. 10-2021-0153777

(51) Int. Cl.
*G06T 7/194* (2017.01)
*G06T 9/00* (2006.01)
(Continued)

(52) U.S. Cl.
CPC .............. *G06T 7/194* (2017.01); *G06T 9/002* (2013.01); *G06V 10/255* (2022.01); *G06V 10/28* (2022.01);
(Continued)

(58) Field of Classification Search
CPC .................... G06T 7/194; G06T 9/002; G06T 2207/10024; G06T 2207/10048;
(Continued)

(56) References Cited

U.S. PATENT DOCUMENTS 11,030,480 B2   6/2021  Cho et al.
2015/0334398 A1  11/2015  Socek et al.
(Continued)

FOREIGN PATENT DOCUMENTS

CN    103529927 A  *  1/2014
KR    10-1347750       1/2014
(Continued)

OTHER PUBLICATIONS

Ming-Ming et al., "BING: Binarized Normed Gradients for Objectness Estimation at 300fps" pub. Sep. 2014. (Year: 2014).*
(Continued)

*Primary Examiner* — Mekonen T Bekele
(74) *Attorney, Agent, or Firm* — KILE PARK REED & HOUTTEMAN PLLC

(57) ABSTRACT

Disclosed herein is a method for compressing an image for machine vision, the method including detecting objects in an input image using an object detection network, generating a foreground image including bounding boxes corresponding to the objects and a background image, which is an image acquired by excluding the bounding boxes from the input image, encoding the foreground image and the background image, and decoding the encoded foreground image and the encoded background image.

12 Claims, 9 Drawing Sheets

(51) Int. Cl.
  *G06V 10/20* (2022.01)
  *G06V 10/28* (2022.01)

(52) U.S. Cl.
  CPC ........... *G06T 2207/10024* (2013.01); *G06T 2207/10048* (2013.01); *G06T 2207/20081* (2013.01); *G06T 2207/20084* (2013.01)

(58) Field of Classification Search
  CPC ........... G06T 2207/20081; G06T 2207/20084; G06V 10/255; G06V 10/28; G06V 20/56; G06V 10/82; H04N 19/124; H04N 19/132; H04N 19/167; H04N 19/174; H04N 19/59
  See application file for complete search history.

(56) References Cited

U.S. PATENT DOCUMENTS

| | | |
|---|---|---|
| 2016/0112674 A1 | 4/2016 | Li et al. |
| 2018/0253848 A1* | 9/2018 | Chen .................. G06T 7/11 |
| 2018/0285647 A1* | 10/2018 | Chen .................. G06V 20/41 |
| 2019/0347803 A1* | 11/2019 | Lim .................. G06T 7/11 |
| 2020/0236302 A1 | 7/2020 | Park |
| 2021/0366081 A1 | 11/2021 | Kim et al. |

FOREIGN PATENT DOCUMENTS

| | | | | |
|---|---|---|---|---|
| KR | 20150032764 A | * | 3/2015 | |
| KR | 10-2016-0134768 | | 11/2016 | |
| KR | 20160134768 A | * | 11/2016 | ........... H04N 19/182 |
| KR | 10-2019-0087264 | | 7/2019 | |
| KR | 20190087264 A | * | 7/2019 | |
| KR | 10-2020-0026026 | | 3/2020 | |
| KR | 10-2020-0062686 | | 6/2020 | |

OTHER PUBLICATIONS

Ting-Wu "ADASCALE: Towards Real-Time Video Object Detection Using Adaptive Scaling", Proceedings of the 2nd SysML Conference, pub 2019 (Year: 2019).*

* cited by examiner

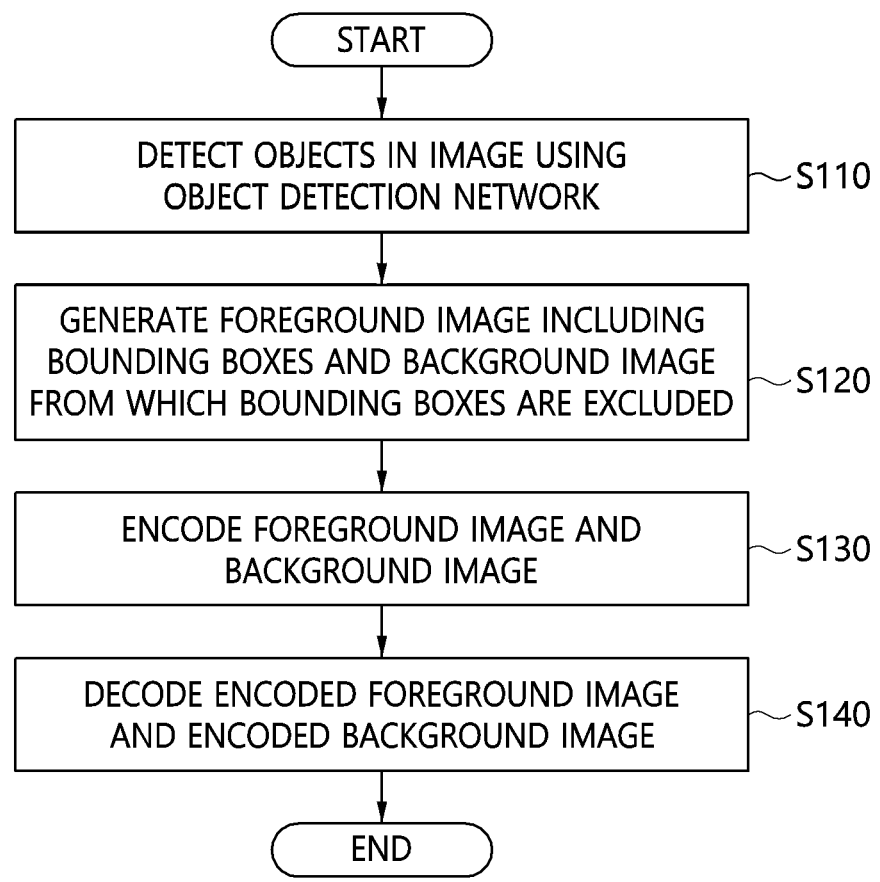

FIG. 2

---
ALGORITHM 1 BINARY MAP GENERATION ALGORITHM

---

Input : IR image
Output : Binary Map Images

1. Obtain predicted bounding boxes, ($x,y$ of top-lefe comer and $x,y$ of bottom-right corner), $BBox$ = { $obj_1$, $obj_2$, ..., $obj_n$ } using neural network
2. for $i$ = 1, ..., $n$ do
3:     if ($h$×2 < $w$ or $w$×2 < $h$) and $h$×$w$ < $w$ < 64×64 then
4:         $pw \leftarrow (h+w) / 2$, $ph \leftarrow (h+w) / 2$
5:     else if $h \leqq w$ then
6:         $pw \leftarrow h$, $ph \leftarrow h$
7:     else
8:         $pw \leftarrow w$, $ph \leftarrow w$
9:     if $w$×$h$ < 32×32 then
10:        $x$ margin $\leftarrow pw$×2, $y$ margin $\leftarrow ph$×2
11:    else if $w$×$h$ < 96×96 then
12:        $x$ margin $\leftarrow pw$×2, $y$ margin $\leftarrow ph$×2
13:    else
14:    $x$ margin $\leftarrow pw$, $y$ margin $\leftarrow ph$
15:    $adjusted\ obj_i[0] \leftarrow obj_i[0]$ - int($x$ $margin$/ 2)
16:    $adjusted\ obj_i[1] \leftarrow obj_i[1]$ - int($y$ $margin$/ 2)
17:    $adjusted\ obj_i[2] \leftarrow obj_i[2]$ + int($x$ $margin$/ 2)
18:    $adjusted\ obj_i[3] \leftarrow obj_i[3]$ + int($y$ $margin$/ 2)
19: for $i$ = 1, ..., $n$ do
20:    create foreground map with extended $adjusted\ obj_i$ by 4 pixels
21:    create foreground map with reduced $adjusted\ obj_i$ by 4 pixels

APPARATUS AND METHOD FOR COMPRESSING IMAGE FOR MACHINE VISION

CROSS REFERENCE TO RELATED APPLICATIONS

This application claims the benefit of Korean Patent Application No. 10-2021-0035397, filed Mar. 18, 2021, and No. 10-2021-0153777, filed Nov. 10, 2021, which are hereby incorporated by reference in their entireties into this application.

BACKGROUND OF THE INVENTION

1. Technical Field

The present invention relates generally to technology for compressing an image for object detection by machine vision.

More particularly, the present invention relates to technology for processing an image by separating objects such that efficient object detection by machine vision is realized using a thermal infrared image.

2. Description of the Related Art

Recently, object detection technology has rapidly advanced in various fields. Particularly, autonomous driving technology requires consistent object detection capability. Generally, high-quality images are known to enable better object detection performance. However, high-quality images may impose a burden on systems. Also, when a network environment is poor, it may take a long time to transmit and receive high-quality images, or transmission and reception of high-quality images may be unstable.

Currently, most research on object detection is based on RGB images, and thus it is difficult to apply an existing object detection network to images acquired in low-light environments.

Here, infrared images may be an alternative to RGB images because they can be acquired with consistent quality, regardless of the amount of available light. However, thermal infrared images are not used for object detection by human vision, and existing encoding methods may be less efficient when used as image-encoding methods for machine vision.

DOCUMENTS OF RELATED ART (Patent Document 1) Korean Patent Application Publication No. 10-2020-0026026, titled "Electronic device for high-speed compression processing of feature map of CNN utilizing system and controlling method thereof".

SUMMARY OF THE INVENTION

An object of the present invention is to efficiently compress a thermal infrared image, which can be acquired regardless of the weather or illuminance.

Another object of the present invention is to process a thermal infrared image such that object detection by machine vision is performed correctly.

In order to accomplish the above objects, a method for compressing an image for machine vision according to an embodiment of the present invention includes detecting objects in an input image using an object detection network, generating a foreground image, including bounding boxes corresponding to the objects, and a background image, which is an image acquired by excluding the bounding boxes from the input image, encoding the foreground image and the background image, and decoding the encoded foreground image and the encoded background image.

Here, encoding the foreground image and the background image may include downsampling the foreground image and the background image, separately encoding the downsampled foreground image and background image, and multiplexing the encoded foreground image and background image and transmitting the multiplexed image.

Here, generating the foreground image and the background image may include adjusting the sizes of the bounding boxes based on the ratios between the heights and widths of the bounding boxes and extending a boundary, which separates the foreground image and the background image, by a preset number of pixels in each of the foreground image and the background image.

Here, downsampling the foreground image and the background image may include downsampling the foreground image by a first scaling factor and downsampling the background image by a second scaling factor, which is equal to or less than the first scaling factor.

Here, encoding the foreground image and the background image may include encoding the foreground image using a first quantization parameter (QP) and encoding the background image using a second quantization parameter, which is greater than the first quantization parameter.

Here, decoding the encoded foreground image and the encoded background image may include demultiplexing the multiplexed foreground image and background image, separately decoding the demultiplexed foreground image and background image, merging the decoded foreground image and background image, and upscaling the merged image.

Here, the decoded background image may be upscaled so as to have a resolution corresponding to the resolution of the decoded foreground image.

Here, the input image may correspond to a thermal infrared image.

Here, the object detection network may correspond to a network adjusted using training data including thermal infrared images and RGB images.

Here, adjusting the sizes of the bounding boxes may comprise, when the ratio between the height and width of any one of the bounding boxes is greater than a preset first ratio or is less than the reciprocal of the first ratio, extending the height and width of the bounding box by the average value of the height and the width, and when the ratio between the height and width of the bounding box is equal to or less than the first ratio and is equal to or greater than the reciprocal of the first ratio, extending the height and width of the bounding box by the smaller one of the height and the width.

In order to accomplish the above objects, an apparatus for compressing an image for machine vision according to an embodiment of the present invention includes an object detection unit for detecting objects in an input image using an object detection network, an image generation unit for generating a foreground image, including bounding boxes corresponding to the objects, and a background image, which is an image acquired by excluding the bounding boxes from the input image, an encoding unit for encoding the foreground image and the background image; and a decoding unit for decoding the encoded foreground image and the encoded background image.

Here, the encoding unit may include a downsampling unit for downsampling the foreground image and the background image, a first encoding unit for encoding the downsampled foreground image, a second encoding unit for encoding the downsampled background image, and a multiplexing unit for multiplexing the encoded foreground image and background image and transmitting the multiplexed image.

Here, the image generation unit may adjust the sizes of the bounding boxes based on the ratios between the heights and widths of the bounding boxes, and may extend a boundary, which separates the foreground image and the background image, by a preset number of pixels in each of the foreground image and the background image.

Here, the downsampling unit may downsample the foreground image by a first scaling factor and downsample the background image by a second scaling factor, which is equal to or less than the first scaling factor.

Here, the first encoding unit may encode the foreground image using a first quantization parameter (QP), and the second encoding unit may encode the background image using a second quantization parameter, which is greater than the first quantization parameter.

Here, the decoding unit may include a demultiplexing unit for demultiplexing the multiplexed foreground image and background image, a first decoding unit for decoding the demultiplexed foreground image, a second decoding unit for decoding the demultiplexed background image, a merging unit for merging the decoded foreground image and background image, and an upscaling unit for upscaling the merged image.

Here, the decoded background image may be upscaled so as to have a resolution corresponding to the resolution of the decoded foreground image.

Here, the input image may correspond to a thermal infrared image.

Here, the object detection network may correspond to a network adjusted using training data including thermal infrared images and RGB images.

Here, when the ratio between the height and width of any one of the bounding boxes is greater than a preset first ratio or less than the reciprocal of the first ratio, the image generation unit may extend the height and width of the bounding box by the average value of the height and the width, and when the ratio between the height and width of the bounding box is equal to or less than the first ratio and is equal to or greater than the reciprocal of the first ratio, the image generation unit may extend the height and width of the bounding box by the smaller one of the height and the width.

BRIEF DESCRIPTION OF THE DRAWINGS

The above and other objects, features, and advantages of the present invention will be more clearly understood from the following detailed description taken in conjunction with the accompanying drawings, in which:

FIG. 1 is a flowchart illustrating a method for compressing an image for machine vision according to an embodiment of the present invention;

FIG. 2 is a view illustrating an example of an algorithm that is used in a step for adjusting the sizes of bounding boxes;

DESCRIPTION OF THE PREFERRED EMBODIMENTS

Figure 3:
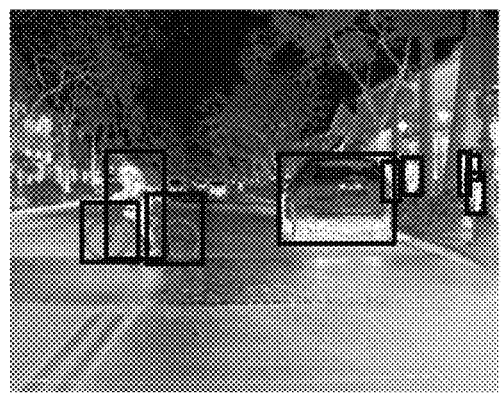
FIGS. 3 and 4 are views illustrating an example in which the bounding boxes of an image of a training dataset are modified.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a flowchart illustrating a method for compressing an image for machine vision according to an embodiment of the present invention.

Referring to FIG. 1, in the method for compressing an image for machine vision, performed in an image compression apparatus, objects in an input image are detected using an object detection network at step S110.

Here, the input image may be a thermal infrared image (IR image) acquired using a thermal sensor.

Subsequently, a foreground image, including bounding boxes corresponding to the objects detected using the object detection network, and a background image, which is an image acquired by excluding the bounding boxes from the input image, are generated at step S120.

Here, the foreground image and the background image may be images corresponding to binary map images.

Here, although not illustrated in FIG. 1, generating the foreground image and the background image at step S120 may include adjusting the size of at least one of the bounding boxes and extending a boundary, which separates the foreground image and the background image, by a preset number of pixels in each of the foreground image and the background image.

Here, the size of the bounding box may be adjusted based on a comparison with a predetermined threshold size. Here, the size of the bounding box may be represented using any one of the width and height of the bounding box, the minimum/maximum values of the width and the height, the average value of the width and the height, the product of the width and the height, the sum of the width and the height, the ratio between the width and the height, or the like. The predetermined threshold size is a value preset in the image compression apparatus, but is not limited thereto, and an optimum threshold size may be set for a unit of an image sequence, an image, or the like, followed by encoding.

More specifically, adjusting the sizes of the bounding boxes based on the ratios between the heights and widths thereof may comprise, when the ratio between the height and width of any one of the bounding boxes is greater than a preset first ratio or less than the reciprocal of the first ratio, extending the height and width of the bounding box by the average value of the height and the width.

Also, when the ratio between the height and width of the bounding box is equal to or less than the first ratio and is equal to or greater than the reciprocal of the first ratio, the height and width of the bounding box may be extended by the smaller one of the height and the width.

Here, the preset first ratio may be a value greater than 1. For example, the preset first ratio may be set to 2.

Hereinafter, the method of adjusting the size of a bounding box will be described in detail with reference to FIG. 2.

FIG. 2 is a view illustrating an example of an algorithm used in the step of adjusting the sizes of bounding boxes.

Referring to FIG. 2, it can be seen that the size of a bounding box is adjusted depending on the ratio between the height and width of the bounding box and the size of the bounding box, as described above.

The height and width of the bounding box may be checked based on the (x, y) coordinates of the point at the top-left corner of the bounding box surrounding the object detected using an object detection network and the (x, y) coordinates of the point at the bottom-right corner thereof.

Referring to FIG. 2, when the height of the bounding box is greater than twice the width thereof or when the width thereof is greater than twice the height thereof, the average value of the height and the width is input to pw and ph.

When the height of the bounding box is not greater than twice the width thereof and when the width thereof is not greater than twice the height thereof, the smaller one of the height and width of the bounding box is input to pw and ph.

Subsequently, the size by which the bounding box is to be extended may be set based on the size of the bounding box. For example, when w*h is less than 32*32, 2*pw and 2*ph may be input for an x margin and a y margin, respectively.

Subsequently, in order to extend the width and the height by the x margin and the y margin, respectively, the coordinates of the top-left corner of the bounding box and the coordinates of the bottom-right corner thereof are adjusted.

Finally, the boundary between the foreground image and the background image may be extended by n pixels in order to prevent an artifact problem, which can be caused by encoding the foreground image and the background image using different quantization parameters. Here, n may be 2, 3, 4, or an integer greater than 4.

For example, the sizes of the bounding boxes included in the foreground image may be extended by four pixels, and the sizes of the bounding boxes excluded from the background image may be reduced by four pixels.

Here, the number of pixels by which the boundary is extended in order to prevent an artifact problem may be changed in consideration of various factors.

Subsequently, the image compression apparatus may encode the foreground image and the background image at step S130.

Here, although not illustrated in FIG. 1, encoding the foreground image and the background image at step S130 may include downsampling the foreground image and the background image, separately encoding the downsampled foreground image and background image, multiplexing the encoded foreground image and background image, and transmitting the same.

Here, downsampling the foreground image and the background image may include downsampling the foreground image by a first scaling factor and downsampling the background image by a second scaling factor, which is equal to or less than the first scaling factor.

Here, the same single first scaling factor may be applied to all of the foreground images in the input image, and the same single second scaling factor may be applied to all of the background images in the input image.

Alternatively, any one of the foreground images in the input image may have a first scaling factor different from that of at least one of the others. To this end, the number of first scaling factors defined for the input image may be equal to or less than the number of foreground images included in the input image. Conversely, the second scaling factor may be a fixed value, regardless of the number of background images included in the input image.

For example, the first scaling factor may be set to 0.75, and the second scaling factor may be set to 0.75 or 0.5.

However, the relationship between the first scaling factor and the second scaling factor may be changed in consideration of the importance of each of the foreground image and the background image.

Here, separately encoding the downsampled foreground image and background image may include encoding the foreground image using a first Quantization Parameter (QP) and encoding the background image using a second quantization parameter, which is greater than the first quantization parameter.

Here, the same single first quantization parameter may be applied to all of the foreground images in the input image, and the same single second quantization parameter may be applied to all of the background images in the input image.

Alternatively, any one of the foreground images in the input image may have a first quantization parameter different from that of at least one of the others. To this end, the number of first quantization parameters defined for the input image may be equal to or less than the number of foreground images included in the input image.

Conversely, the second quantization parameter may be a fixed value, regardless of the number of background images included in the input image. Any one of the first quantization parameter and the second quantization parameter may be set based on the other one thereof.

Here, the downsampled foreground image and background image may be encoded using an image codec, such as HEVC or a Versatile Video Coding (VVC) codec.

Here, the foreground image may be encoded using the first quantization parameter, which is less than the second quantization parameter, which means that greater loss occurs in the background image than in the foreground image in the encoding process.

Here, encoding the foreground image and encoding the background image may be performed in parallel or individually. Alternatively, all or part of the background image may be encoded in a dependent manner by referring to the foreground image.

Here, the multiplexed foreground image and background image may correspond to a single bitstream. Alternatively, a single bitstream may be configured only with the encoded foreground image. The encoded background image may be optionally included in the single bitstream.

The above-described encoding process may be applied in a manner that is the same as or similar to that of the decoding process to be described later, and thus a repeated description will be omitted.

Subsequently, the image compression apparatus may decode the encoded foreground image and background image at step S140.

Here, although not illustrated in FIG. 1, decoding the encoded foreground image and background image at step S140 may include demultiplexing the multiplexed foreground image and background image, separately decoding the demultiplexed foreground image and background image, merging the decoded foreground image and background image, and upscaling the merged image.

Here, the decoded background image may be upscaled so as to have a resolution corresponding to the resolution of the decoded foreground image.

Here, demultiplexing the multiplexed foreground image and background image may be a process of dividing a single bitstream into bitstreams respectively corresponding to the foreground image and the background image.

Here, the object detection network may be a network acquired by adjusting an existing object detection deep-learning network using training data including thermal infrared images and RGB images.

More specifically, the object detection network may be a network acquired by minutely adjusting the Faster R-CNN X101-FPN model using a FLIR dataset.

Hereinafter, the process of preprocessing training data, which was performed as part of the research leading to the present invention, will be described.

First, a FLIR dataset configured with pairs, each comprising a thermal infrared image and an RGB image simultaneously captured by a thermal infrared camera and an RGB camera, was used. The FLIR dataset is configured with 8862 training images and 1366 validation images.

In the training dataset, a person, a car, a bicycle, a dog, and other types of vehicles are labeled in the MS COCO format for thermal infrared images.

Because some incorrect annotations were present in this dataset, bounding boxes were set again, and the incorrect annotations were modified.

Figure 4:
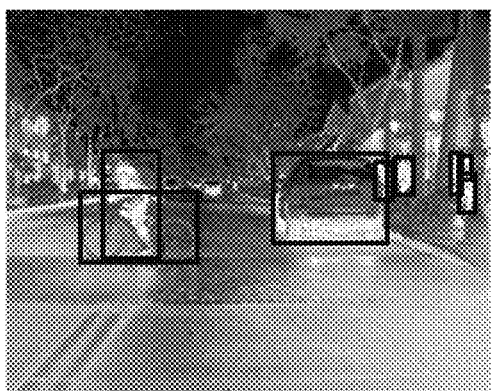

FIGS. 3 and 4 are views illustrating an example of modification of bounding boxes of an image of a training dataset.

Referring to FIGS. 3 and 4, separate bounding boxes are present in the two wheels of a bicycle in FIG. 3, but in FIG. 4, a bounding box surrounding the entire bicycle can be seen. In this manner, some errors were corrected.

Table 1 below illustrates an experimental environment for object detection and minute adjustment of a network.

TABLE 1

| OS | Ubuntu 18.04 LTS |
|---|---|
| GPU | Quadro RTX 8000 |
| Framework | Detectron2 |
| CUDA | 10.2 |
| PyTorch | 1.5.1 |

Subsequently, because the pretrained network was trained using a COCO dataset configured only with RGB images, the network is minutely adjusted in order to improve the accuracy of object detection.

The network is minutely adjusted using Detectron2, having 1000 thermal infrared images and 1000 nighttime RGB images. When the network is minutely adjusted, all layers are set so as to be trained for only three classes, which are a person, a car, and a bicycle, in the present invention. Table 2 illustrates parameters for minutely adjusting the network.

TABLE 2

| Batch Size | 2 |
|---|---|
| Learning Rate | 0.00025 |
| Max Iteration | 2000 |
| RoI Batch Size | 128 |

Figure 5:
FIG. 5 is a view illustrating a result of detection of objects in an image compressed using an image compression method according to an embodiment of the present invention.

FIG. 5 is a view illustrating the result of detection of objects in an image compressed using an image compression method according to an embodiment of the present invention.

The image of FIG. 5 is an image that is compressed using an image compression method according to the present invention, in which a quantization parameter for a foreground image is set to 22, a quantization parameter for a background image is set to 47, and all of the scaling factors are set to 0.75.

Referring to FIG. 5, it can be seen that the background image is distorted due to the high compression ratio, but it still exhibits excellent object detection performance.

Figure 6:
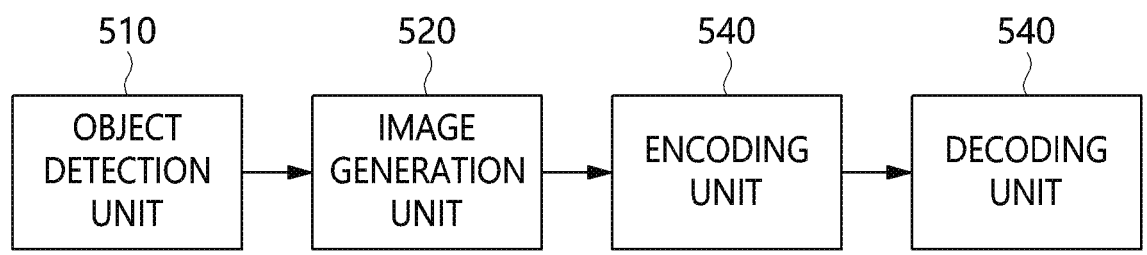
FIG. 6 is a block diagram illustrating an apparatus for compressing an image for machine vision according to an embodiment of the present invention.

FIG. 6 is a block diagram illustrating an apparatus for compressing an image for machine vision according to an embodiment of the present invention.

Referring to FIG. 6, the apparatus for compressing an image for machine vision according to an embodiment of the present invention includes an object detection unit 510 for detecting objects in an input image using an object detection network, an image generation unit 520 for generating a foreground image, including bounding boxes corresponding to the objects, and a background image, which is an image acquired by excluding the bounding boxes from the input image, an encoding unit 530 for encoding the foreground image and the background image, and a decoding unit 540 for decoding the encoded foreground image and the encoded background image.

Here, the input image may be a thermal infrared image acquired using a thermal sensor.

Here, the foreground image and the background image may be images corresponding to binary map images.

Here, the image generation unit 510 may adjust the size of at least one of the bounding boxes and extend a boundary, which separates the foreground image and the background image, by a preset number of pixels in each of the foreground image and the background image.

Here, the size of the bounding box may be adjusted based on a comparison with a predetermined threshold size. Here, the size of the bounding box may be represented using any one of the width and height of the bounding box, the minimum/maximum values of the width and the height, the average value of the width and the height, the product of the width and the height, the sum of the width and the height, the ratio between the width and the height, or the like. The predetermined threshold size is a value preset in the apparatus for compressing an image, but is not limited thereto, and an optimum threshold size may be set for a unit of an image sequence, an image, or the like, followed by encoding.

More specifically, when the ratio between the height and width of any one of the bounding boxes is greater than a preset first ratio or is less than the reciprocal of the first ratio, the image generation unit 520 may extend the height and width of the bounding box by the average value of the height and the width.

Also, when the ratio between the height and width of the bounding box is equal to or less than the first ratio and equal to or greater than the reciprocal of the first ratio, the height and width of the bounding box may be extended by the smaller one of the height and the width.

Here, the preset first ratio may be a value greater than 1.

Hereinafter, the method of adjusting the size of a bounding box will be described in detail with reference to FIG. 2.

Referring to FIG. 2, it can be seen that the size of a bounding box is adjusted depending on the ratio between the height and width of the bounding box and the size of the bounding box, as described above.

The height and width of the bounding box may be checked based on the (x, y) coordinates of the point at the top-left corner of the bounding box surrounding the object detected using an object detection network and the (x, y) coordinates of the point at the bottom-right corner thereof.

Referring to FIG. 2, when the height of the bounding box is greater than twice the width thereof or when the width thereof is greater than twice the height thereof, the average value of the height and the width is input to pw and ph.

When the height of the bounding box is not greater than twice the width thereof and when the width thereof is not greater than twice the height thereof, the smaller one of the height and width of the bounding box is input to pw and ph.

Subsequently, the size by which the bounding box is to be extended may be set based on the size of the bounding box. For example, when w*h is less than 32*32, 2*pw and 2*ph may be input for an x margin and a y margin, respectively.

Subsequently, in order to extend the width and the height by the x margin and the y margin, respectively, the coordinates of the top-left corner of the bounding box and the coordinates of the bottom-right corner thereof are adjusted.

Finally, the boundary between the foreground image and the background image may be extended by n pixels in order to prevent an artifact problem, which can be caused by encoding the foreground image and the background image using different quantization parameters. Here, n may be 2, 3, 4, or an integer greater than 4.

For example, the sizes of the bounding boxes included in the foreground image may be extended by four pixels, and the sizes of the bounding boxes excluded from the background image may be reduced by four pixels.

Here, the number of pixels by which the boundary is extended in order to prevent an artifact problem may be changed in consideration of various factors.

Here, the object detection network may be a network acquired by adjusting an existing object detection deep-learning network using training data including thermal infrared images and RGB images.

More specifically, the object detection network may be a network acquired by minutely adjusting the Faster R-CNN X101-FPN model using a FLIR dataset.

Hereinafter, the process of preprocessing training data, which was performed as part of the research leading to the present invention, will be described.

First, a FLIR dataset configured with pairs, each comprising a thermal infrared image and an RGB image simultaneously captured by a thermal infrared camera and an RGB camera, was used. The FLIR dataset is configured with 8862 training images and 1366 validation images.

In the training dataset, a person, a car, a bicycle, a dog, and other types of vehicles are labeled in the MS COCO format for thermal infrared images.

Because some incorrect annotations were present in this dataset, bounding boxes were set again, and the incorrect annotations were modified.

Referring to FIGS. 3 and 4, separate bounding boxes are present in the two wheels of a bicycle in FIG. 3, but in FIG. 4, a bounding box surrounding the entire bicycle can be seen. In this manner, some errors were corrected.

Figure 7:
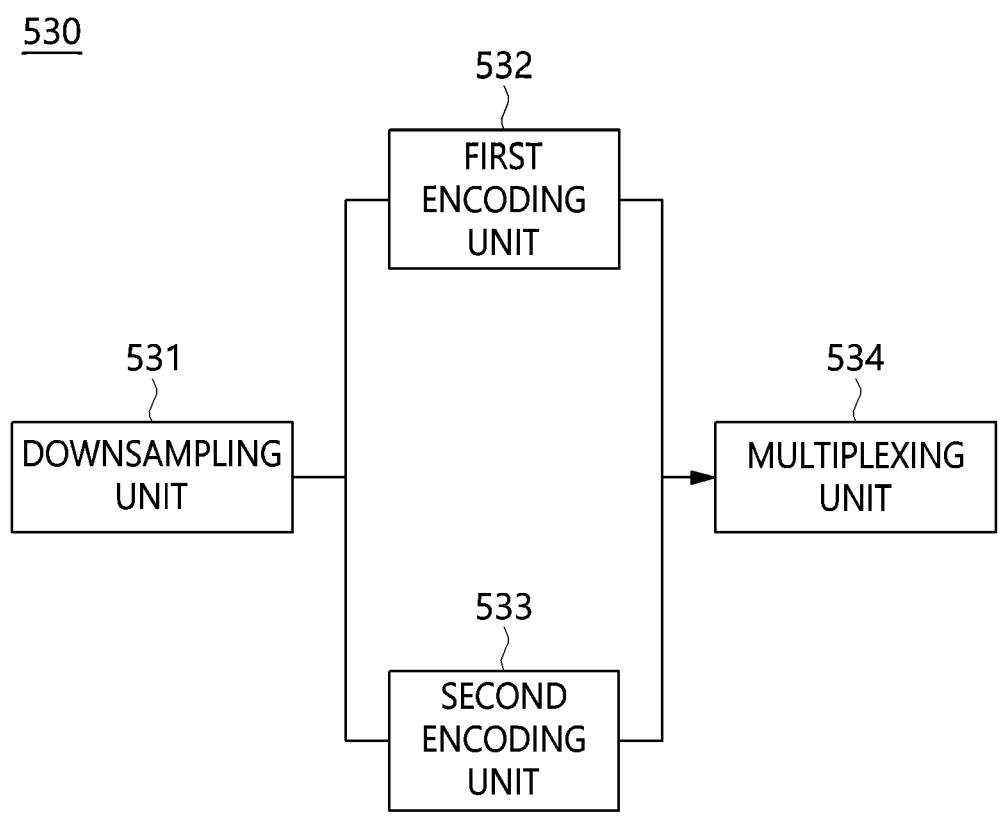
FIG. 7 is a block diagram illustrating an example of the components of the encoding unit of FIG. 5.

FIG. 7 is a block diagram illustrating an example of the components of the encoding unit 530 of FIG. 6.

Referring to FIG. 7, the encoding unit 530 may include a downsampling unit 531 for downsampling a foreground image and a background image, a first encoding unit 532 for encoding the downsampled foreground image, a second encoding unit 533 for encoding the downsampled background image, and a multiplexing unit 534 for multiplexing the encoded foreground image and background image and transmitting the same.

As illustrated in FIG. 7, the first encoding unit 532 and the second encoding unit 533 may be configured to operate in parallel.

Here, the downsampling unit 531 may downsample the foreground image by a first scaling factor and downsample the background image by a second scaling factor, which is equal to or less than the first scaling factor.

Here, the same single first scaling factor may be applied to all of the foreground images in the input image, and the same single second scaling factor may be applied to all of the background images in the input image.

Alternatively, any one of the foreground images in the input image may have a first scaling factor different from that of at least one of the others. To this end, the number of first scaling factors defined for the input image may be equal to or less than the number of foreground images included in the input image. Conversely, the second scaling factor may be a fixed value, regardless of the number of background images included in the input image. For example, the first scaling factor may be set to 0.75, and the second scaling factor may be set to 0.75 or 0.5.

However, the relationship between the first scaling factor and the second scaling factor may be changed in consideration of the importance of each of the foreground image and the background image.

Here, the first encoding unit 532 may encode the foreground image using a first Quantization Parameter (QP), and the second encoding unit 533 may encode the background image using a second quantization parameter, which is greater than the first quantization parameter.

Here, the same single first quantization parameter may be applied to all of the foreground images in the input image, and the same single second quantization parameter may be applied to all of the background images in the input image.

Alternatively, any one of the foreground images in the input image may have a first quantization parameter different from that of at least one of the others. To this end, the number of first quantization parameters defined for the input image may be equal to or less than the number of foreground images included in the input image.

Conversely, the second quantization parameter may be a fixed value regardless of the number of background images included in the input image. Any one of the first quantization parameter and the second quantization parameter may be set based on the other one thereof.

Here, the downsampled foreground image and background image may be encoded using an image codec, such as HEVC or a Versatile Video Coding (VVC) codec.

Here, the foreground image may be encoded using the first quantization parameter, which is less than the second quantization parameter, which means that greater loss occurs in the background image than in the foreground image in the encoding process.

Here, the multiplexed foreground image and background image, which are multiplexed by the multiplexing unit 534, may correspond to a single bitstream. Alternatively, a single bitstream may be configured only with the encoded foreground image. The encoded background image may be optionally included in the single bitstream.

The above-described encoding process may be applied in a manner that is the same as or similar to that of the decoding process to be described later, and thus a repeated description will be omitted.

Figure 8:
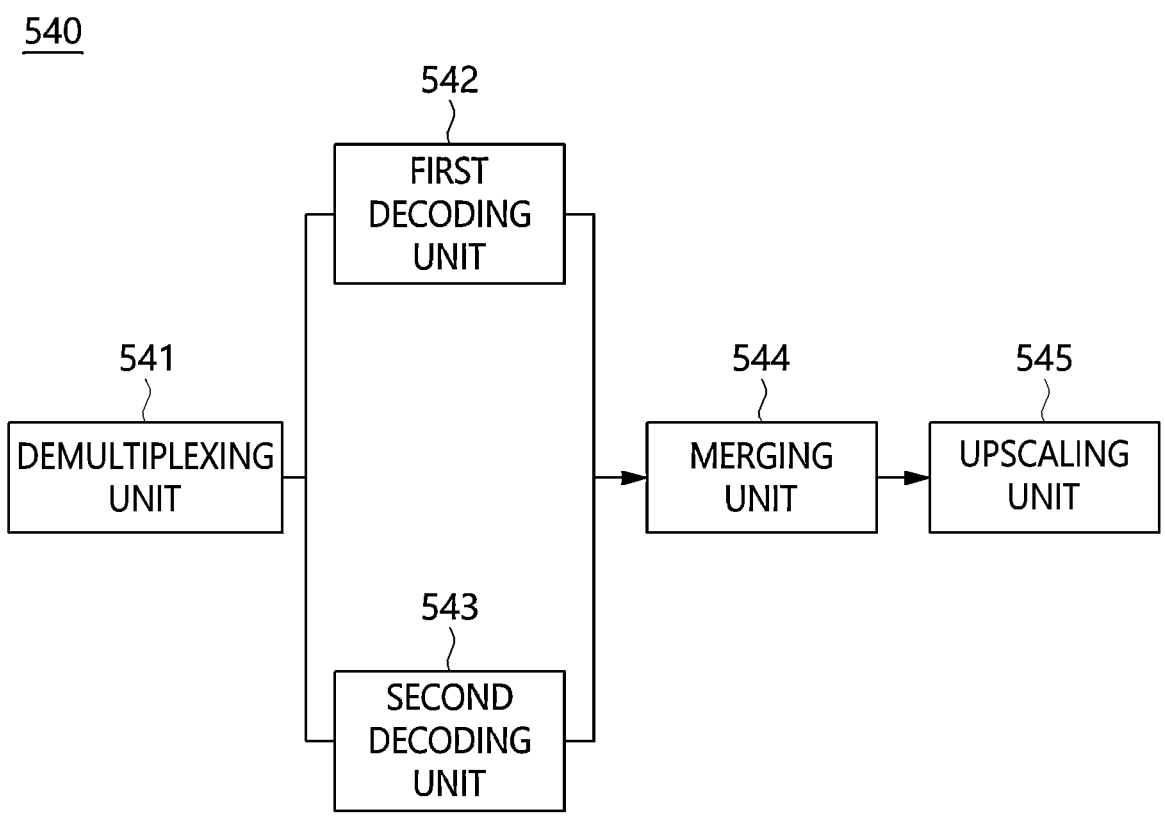
FIG. 8 is a block diagram illustrating an example of the components of the decoding unit of FIG. 5.

FIG. 8 is a block diagram illustrating an example of the components of the decoding unit 540 of FIG. 6.

Referring to FIG. 8, the decoding unit 540 may include a demultiplexing unit 541 for demultiplexing the multiplexed foreground image and background image, a first decoding unit 542 for decoding the demultiplexed foreground image, a second decoding unit 543 for decoding the demultiplexed background image, a merging unit 544 for merging the decoded foreground image and background image, and an upscaling unit 545 for upscaling the merged image.

Here, the background image decoded by the second decoding unit may be upscaled so as to have a resolution corresponding to the resolution of the foreground image decoded by the first decoding unit.

Here, the demultiplexing unit 541 may divide a single bitstream into bitstreams respectively corresponding to a foreground image and a background image.

The method for compressing an image for machine vision according to an embodiment of the present invention may secure high object detection performance while efficiently compressing a thermal infrared image.

Table 3 below is a table illustrating mAP and bpp of the result of object detection for the input image that is encoded and decoded using quantization parameters.

Also, Table 4 below is the result of measuring mAP and bpp while varying the quantization parameters and scaling factors of a foreground image and a background image according to the method proposed in the present invention.

TABLE 3

| Scaling Factor | QP | mAP of Pre-trained Network | mAP of Fine-tuned Network | bpp |
| --- | --- | --- | --- | --- |
| 1.0 | 22 | 29.379 | 39.446 | 1.807 |
|  | 27 | 29.097 | 39.643 | 1.224 |
|  | 32 | 27.842 | 37.69 | 0.306 |
|  | 37 | 20.631 | 33.784 | 0.131 |
|  | 42 | 10.134 | 23.069 | 0.065 |
|  | 47 | 2.910 | 10.634 | 0.030 |

TABLE 4

| FG Scaling Factor | BG Scaling Factor | FG QP | BG QP | mAP | bpp |
| --- | --- | --- | --- | --- | --- |
| 0.75 | 0.75 | 22 | 27 | 40.500 | 0.381 |
|  |  | 22 | 32 | 40.390 | 0.315 |
|  |  | 22 | 37 | 40.011 | 0.277 |
|  |  | 22 | 42 | 40.071 | 0.256 |
|  |  | 22 | 47 | 38.876 | 0.246 |
|  |  | 27 | 32 | 39.422 | 0.207 |
|  |  | 27 | 37 | 38.864 | 0.169 |
|  |  | 27 | 42 | 38.799 | 0.148 |
|  |  | 27 | 47 | 38.235 | 0.138 |
|  |  | 32 | 37 | 36.304 | 0.116 |
|  |  | 32 | 42 | 35.730 | 0.095 |
|  |  | 32 | 47 | 35.357 | 0.085 |
|  |  | 37 | 42 | 29.898 | 0.065 |
|  |  | 37 | 47 | 29.541 | 0.054 |
|  |  | 42 | 47 | 18.455 | 0.036 |
|  | 0.5 | 22 | 27 | 40.388 | 0.545 |
|  |  | 22 | 32 | 40.754 | 0.376 |
|  |  | 22 | 37 | 40.670 | 0.308 |
|  |  | 22 | 42 | 40.115 | 0.272 |
|  |  | 22 | 47 | 39.191 | 0.253 |
|  |  | 27 | 32 | 39.374 | 0.267 |
|  |  | 27 | 37 | 39.435 | 0.200 |
|  |  | 27 | 42 | 39.072 | 0.164 |
|  |  | 27 | 47 | 38.456 | 0.145 |
|  |  | 32 | 37 | 37.014 | 0.147 |
|  |  | 32 | 42 | 36.394 | 0.111 |
|  |  | 32 | 47 | 35.612 | 0.092 |
|  |  | 37 | 42 | 30.317 | 0.081 |
|  |  | 37 | 47 | 30.088 | 0.062 |
|  |  | 42 | 47 | 18.773 | 0.043 |

Figure 9:
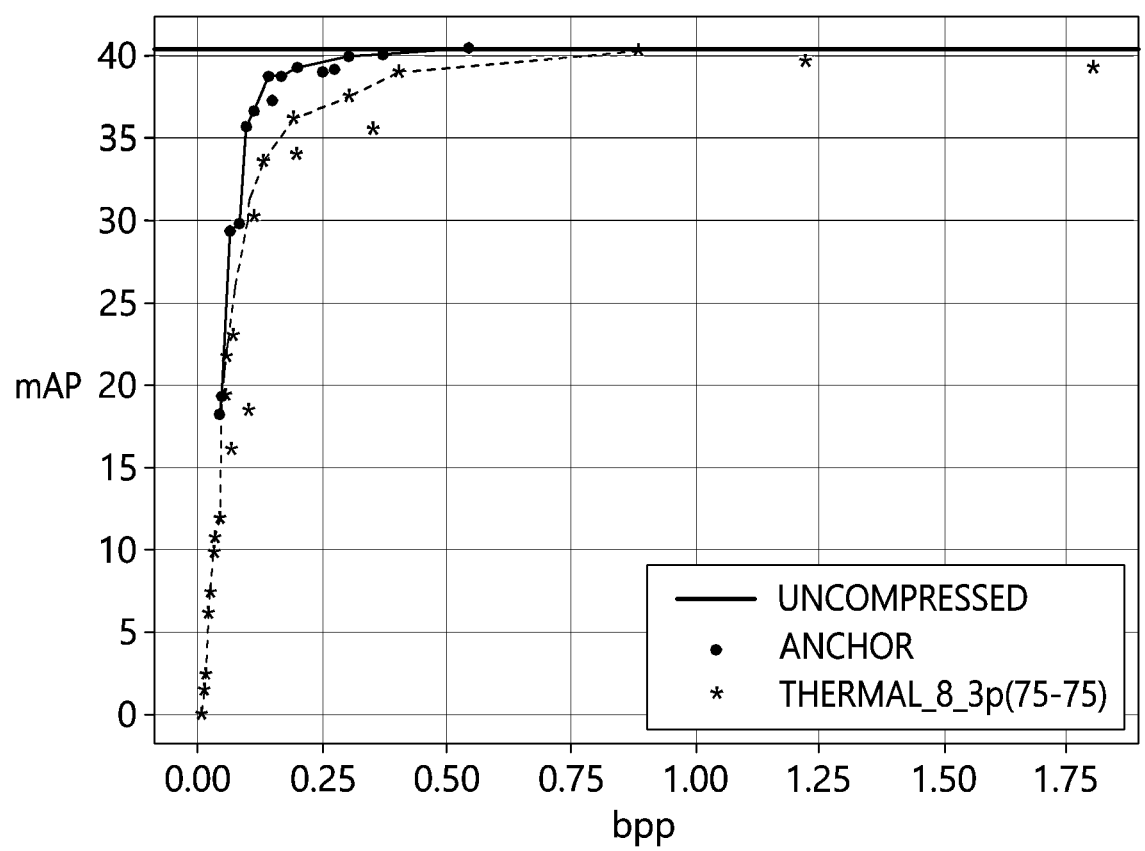
FIG. 9 is a graph illustrating a Pareto front curve of a first embodiment.

FIG. 9 is a graph illustrating a Pareto front curve of a first embodiment.

Referring to FIG. 9, it can be seen that the graph of the first embodiment is a Pareto front curve illustrating mAP with respect to bpp when a scaling factor is set to 0.75 and when an object is detected through an image processed using an image compression method according to an embodiment of the present invention.

Figure 10:
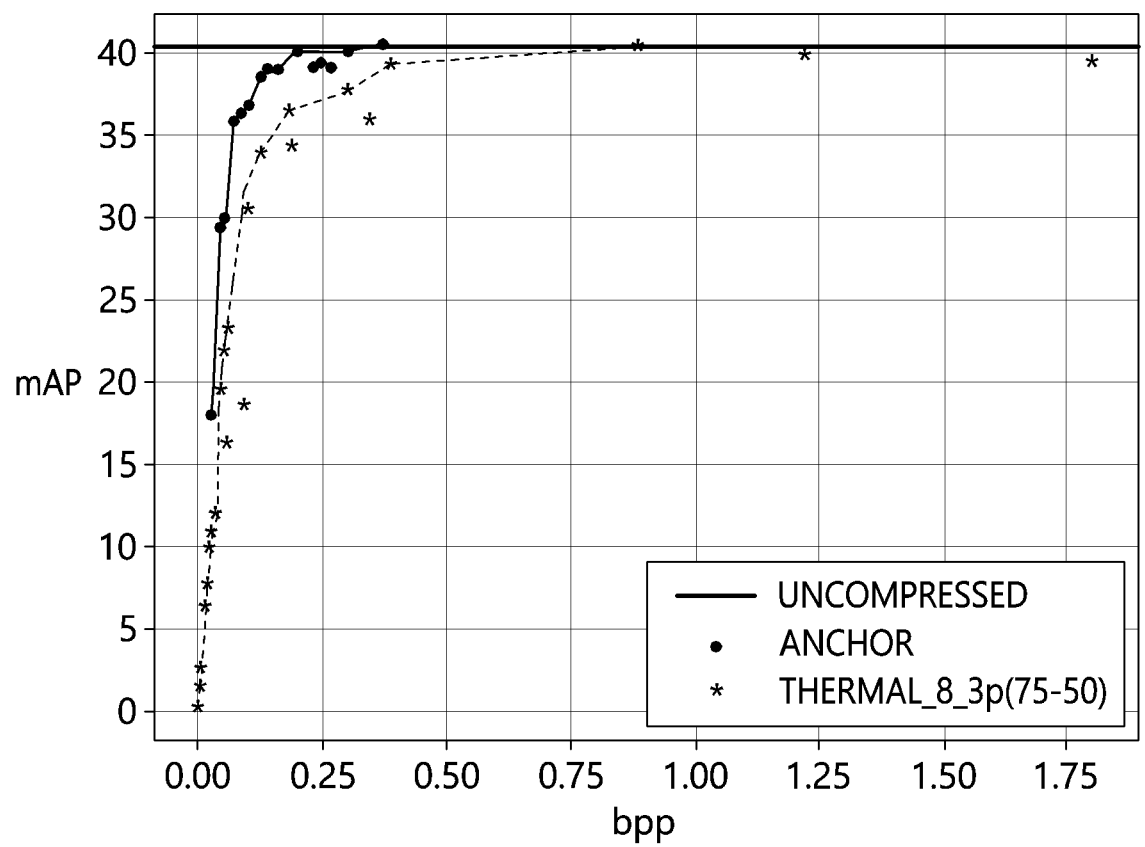
FIG. 10 is a graph illustrating a Pareto front curve of a second embodiment.

FIG. 10 is a graph illustrating a Pareto front curve of a second embodiment.

Referring to FIG. 10, it can be seen that the graph of the second embodiment is a Pareto front curve illustrating mAP with respect to bpp when the scaling factor of a foreground image and that of a background image are set to 0.75 and 0.5, respectively, and when an object is detected through an image processed using an image compression method according to an embodiment of the present invention.

Referring to FIGS. 9 to 10, it is confirmed that the method for compressing an image for machine vision proposed in the present invention has better object detection performance than an existing method in which an input image is encoded and decoded without change.

Figure 11:
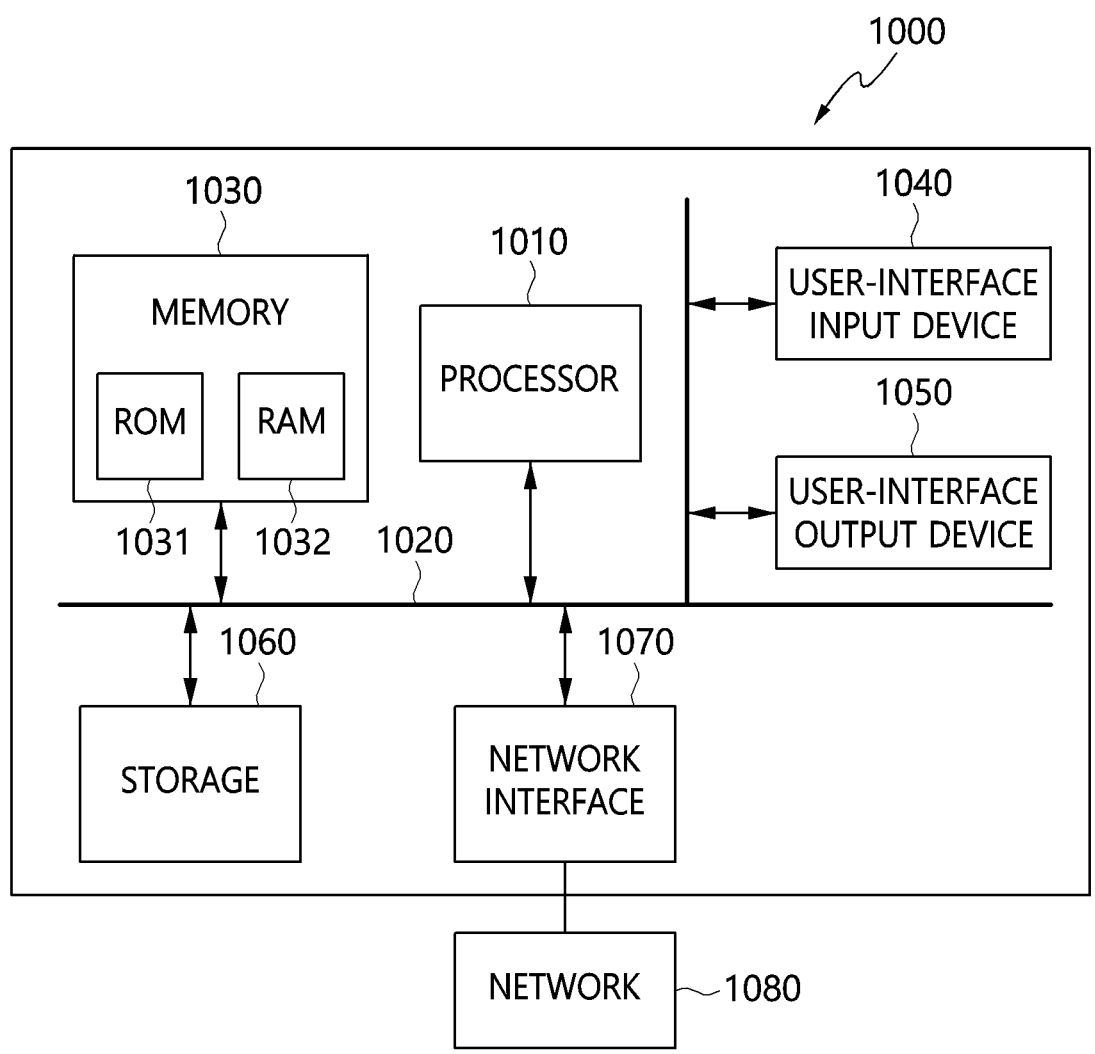
FIG. 11 is a view illustrating a computer system configuration according to an embodiment.

FIG. 11 is a view illustrating a computer system configuration according to an embodiment.

The apparatus for compressing an image for machine vision according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to the present invention, a thermal infrared image, which can be acquired regardless of the weather or illuminance, may be efficiently compressed.

Also, the present invention may process a thermal infrared image such that object detection by machine vision is performed correctly.

Specific implementations described in the present invention are embodiments and are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. A method for compressing an image for machine vision, comprising:
   detecting objects in an input image using an object detection network;
   generating a foreground image, including bounding boxes corresponding to the objects, from the input image;
   encoding the foreground image; and
   wherein generating the foreground image includes:
      determining initial bounding boxes corresponding to the objects,
      extending sizes of the initial bounding boxes, and
      generating the foreground image including the bounding boxes with extended sizes,
   wherein in response to a ratio between a height and a width of a bounding box being greater than a preset first ratio or less than a reciprocal of the preset first ratio, the height and the width of the bounding box are extended by an average value of the height and the width, and
   wherein in response to the ratio between the height and the width of the bounding box being equal to or less than the preset first ratio or being equal to or greater than the reciprocal of the preset first ratio, the height and the width of the bounding box are extended by a smaller one of the height and the width.

2. The method of claim 1, wherein the method further comprises:
   determining on a scaling factor for the foreground image.

3. The method of claim 2, wherein the method further comprises generating a background image corresponding to a remaining image excluding the foreground image from the input image, and
   wherein a scaling factor for the background image is equal to or less than & the scaling factor for the foreground image.

4. The method of claim 3, wherein
   the foreground image is encoded by using a first quantization parameter (QP), and
   wherein the background image is encoded by using a second quantization parameter, which is greater than the first quantization parameter.

5. The method of claim 2, wherein the scaling factor is obtained by modifying an initial scaling factor.

6. The method of claim 1, wherein:
   the input image corresponds to a thermal infrared image, and
   the object detection network corresponds to a network adjusted using training data including thermal infrared images and RGB images.

7. An apparatus for compressing an image for machine vision, comprising:
   an object detector configured to detect objects in an input image using an object detection network;
   an image generator configured to:
      determine initial bounding boxes corresponding to the objects,
      extend sizes of the initial bounding boxes by, and
      generate a foreground image, including the bounding boxes with extended sizes; and
   an encoder configured to encode the foreground image,
   wherein in response to a ratio between a height and a width of a bounding box being greater than a preset first ratio or less than a reciprocal of the preset first ratio, the height and the width of the bounding box are extended by an average value of the height and the width, and
   wherein in response to the ratio between the height and the width of the bounding box being equal to or less than the preset first ratio or being equal to or greater than the reciprocal of the preset first ratio, the height and the width of the bounding box are extended by a smaller one of the height and the width.

8. The apparatus of claim 7, wherein:
   the apparatus further includes:
   a downsampler configured to:
   determine a scaling factor for the foreground image.

9. The apparatus of claim 8, wherein the image generator is further configured to generate a background image corresponding to a remaining image excluding the foreground image from the input image,
   wherein the downsampler is further configured to determine a scaling factor for the background image and
   wherein the scaling factor for the background image is equal to or less than the scaling factor for the foreground image.

10. The apparatus of claim 9, wherein:
the encoder comprises a first encoder to encode the foreground image and a second encoder to encode the background image,
wherein:
the first encoder is configured to encode the foreground image using a first quantization parameter (QP), and
the second encoder is configured to encode the background image using a second quantization parameter, which is greater than the first quantization parameter.

11. The apparatus of claim 8, wherein the scaling factor is obtained by modifying an initial scaling factor.

12. The apparatus of claim 7, wherein:
the input image corresponds to a thermal infrared image, and
the object detection network corresponds to a network adjusted using training data including thermal infrared images and RGB images.

\* \* \* \* \*